US012804211B2

(12) United States Patent
Watanabe

(10) Patent No.: US 12,804,211 B2
(45) Date of Patent: Nov. 17, 2026

(54) COMMUNICATION APPARATUS, CONTROL METHOD, AND STORAGE MEDIUM

(71) Applicant: CANON KABUSHIKI KAISHA, Tokyo (JP)

(72) Inventor: Kazunari Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 516 days.

(21) Appl. No.: 18/474,939

(22) Filed: Sep. 26, 2023

(65) Prior Publication Data

US 2024/0107094 A1 Mar. 28, 2024

(30) Foreign Application Priority Data

Sep. 28, 2022 (JP) ................................ 2022-154700

(51) Int. Cl.

| | |
|---|---|
| ***H04N 21/242*** | (2011.01) |
| ***H04L 69/00*** | (2022.01) |
| ***H04N 21/8547*** | (2011.01) |

(52) U.S. Cl.

CPC .......... *H04N 21/242* (2013.01); *H04L 69/00* (2013.01); *H04N 21/8547* (2013.01)

(58) Field of Classification Search

CPC ... H04N 21/242; H04N 21/8547; H04L 69/00

See application file for complete search history.

(56) References Cited

U.S. PATENT DOCUMENTS

| | | | | |
|---|---|---|---|---|
| 2013/0235878 A1* | 9/2013 | Hirota | H04J 3/0682 | 370/412 |
| 2015/0305028 A1* | 10/2015 | Shibuta | H04W 84/20 | 370/329 |
| 2020/0209409 A1* | 7/2020 | Uchiyama | A61B 6/56 | |

FOREIGN PATENT DOCUMENTS

| | | |
|---|---|---|
| JP | 2004253952 A | 9/2004 |
| JP | 2005167965 A | 6/2005 |
| JP | 2013187766 A | 9/2013 |
| JP | 2014146877 A | 8/2014 |
| JP | 2015162719 A | 9/2015 |
| JP | 2021190937 A | 12/2021 |

* cited by examiner

*Primary Examiner* — Angela Widhalm De Rodriguez

(74) *Attorney, Agent, or Firm* — Canon U.S.A., Inc. IP Division

(57) ABSTRACT

A communication apparatus that performs time synchronization using a received time synchronization packet includes a division unit configured to, in a case where an image packet to be transferred to a different communication apparatus exists during a period during which the time synchronization packet is to be transmitted, divide the image packet into a plurality of divided image packets, and a transfer unit configured to transfer the plurality of divided image packets to the different communication apparatus.

11 Claims, 6 Drawing Sheets

COMMUNICATION APPARATUS, CONTROL METHOD, AND STORAGE MEDIUM

BACKGROUND

Field

The present disclosure relates to a synchronous communication technique for synchronizing a plurality of communication apparatuses connected via a network.

Description of the Related Art

In recent years, attention has been paid to a technique of performing multi-view synchronous image capturing by installing a plurality of cameras at different positions, and generating virtual viewpoint content using multi-view images obtained by the image capturing. By the technique of generating virtual viewpoint content, it becomes possible to view a highlight scene of sport or the like from various angles, and it is possible to provide high sense of realism to viewers.

There has been a method of extracting image data from a predetermined region in captured images obtained by a plurality of cameras, and generating a virtual viewpoint video using the extracted image data. Each camera transfers image data obtained by image capturing to a communication apparatus connected thereto one-on-one. Each communication apparatus constructs a daisy chain network, and transmits acquired image data to an image accumulation server using the daisy chain network. An image processing apparatus connected to the image accumulation server generates a virtual viewpoint video based on a large number of pieces of image data transmitted from the communication apparatuses.

To generate the above-described virtual viewpoint video, it is necessary to synchronize image capturing timings of a plurality of cameras. Thus, each communication apparatus implements time synchronization by performing synchronization with a time server using a function of a precision time protocol (PTP) in the Institute of Electrical and Electronics Engineers (IEEE) 1588 standard. Each communication apparatus implements the time synchronization by executing a time synchronization sequence in which a PTP packet having the function of the PTP is transmitted to and received from the time server.

IEEE 802.1Qbu and IEEE 802.3br are standards for performing, on the same network, transmission of image data with a large transmission amount and transmission of control data for implementing the time synchronization required to be executed in real time. In these standards, when transmission processing of data (communication packet) with high priority is to be performed, transmission of the communication packet with high priority is performed while transmission of a communication packet being transmitted is interrupted.

Japanese Patent Application Laid-Open No. 2005-167965 discusses a direct memory access (DMA) transmission method to be used when data to be transmitted is accumulated in a queue, to efficiently use the standards of the IEEE 802.1Qbu and 802.3br.

The DMA transmission method discussed in Japanese Patent Application Laid-Open No. 2005-167965 uses the standards of the IEEE 802.1 Qbu/802.3br. Japanese Patent Application Laid-Open No. 2005-167965 does not discuss a case where the standards of the IEEE 802.1Qbu/802.3br are not used. In the case where the standards of the IEEE 802.1Qbu/802.3br are not used, it becomes difficult to perform both the transmission of image data with a large transmission amount and the transmission of control data for implementing the time synchronization required to be executed in real time.

In particular, in a case where a transmission request of a PTP packet is issued during image data transfer in a communication apparatus that relays image data as a large communication packet on a network, the transmission of the PTP packet is put on standby until the transmission of the image data ends. As a result, a delay occurs in the transmission of the PTP packet.

In a system in which a large number of communication apparatuses are daisy-chained, the above-described delay deteriorates synchronization accuracy of the entire system.

SUMMARY

Various embodiments of the present disclosure are directed to providing a communication apparatus that can prevent a synchronization delay when an image packet is transmitted.

According to one embodiment of the present disclosure, a communication apparatus that performs time synchronization using a received time synchronization packet includes a division unit configured to, in a case where an image packet to be transferred to a different communication apparatus exists during a period during which the time synchronization packet is to be transmitted, divide the image packet into a plurality of divided image packets, and a transfer unit configured to transfer the plurality of divided image packets to the different communication apparatus.

Further features of the present disclosure will become apparent from the following description of exemplary embodiments with reference to the attached drawings.

DESCRIPTION OF THE EMBODIMENTS

Figure 1:
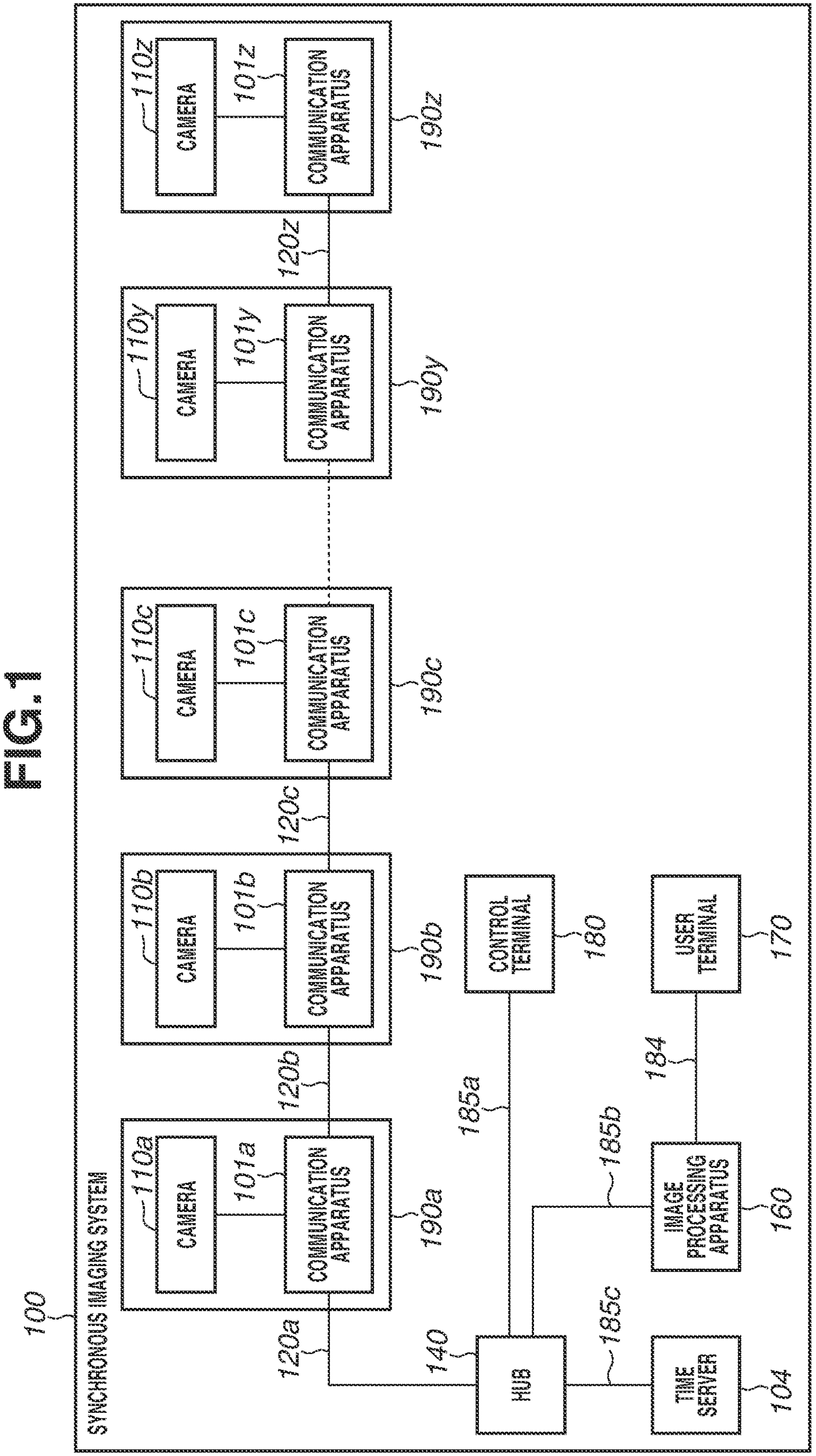
FIG. 1 is a configuration diagram of a synchronous imaging system.

Hereinafter, an exemplary embodiment will be described in detail with reference to the accompanying drawings. The following exemplary embodiment is not intended to limit the invention set forth in the appended claims. A plurality of features is described in the exemplary embodiment, but not all of the plurality of features is essential for every embodiment of the present disclosure. In addition, the plurality of features may be freely combined. In the accompanying drawings, the same or similar components are assigned the same reference numeral, and a redundant description thereof will be omitted.

FIG. 1 is a configuration diagram of a synchronous imaging system 100 according to a first exemplary embodiment. The synchronous imaging system 100 is a synchronous imaging system that executes a time synchronization sequence using a precision time protocol (PTP) packet, for example. The synchronous imaging system 100 illustrated in FIG. 1 includes 26 sets of sensor systems 190*a* to 190*z*, a time server 104, a hub 140, an image processing apparatus 160, a user terminal 170, and a control terminal 180. The sensor systems 190*a* to 190*z* are connected by daisy chains 120*a* to 120*z*. By use of a daisy chain connection, it is possible to reduce the number of connection cables and save the labor of a wiring work. In the following description, the daisy chains 120*a* to 120*z* will be sometimes referred to as daisy chains 120.

The sensor systems 190*a* to 190*z* respectively include cameras 110*a* to 110*z* and communication apparatuses 101*a* to 101*z*. The synchronous imaging system 100 according to the present exemplary embodiment includes the plurality of cameras 110*a* to 110*z* to capture images of a subject from a plurality of directions. The sensor systems 190*a* to 190*z* connect to the time server 104, the image processing apparatus 160, and the control terminal 180 via the hub 140. The user terminal 170 directly connects to the image processing apparatus 160 via a network 184. The user terminal 170 includes a display unit. The user terminal 170 is a personal computer, a tablet terminal, or a smartphone, for example.

The hub 140 is a switching hub having a Transparent Clock (TC) function in the synchronous imaging system 100 that executes the time synchronization sequence using a PTP packet. The TC function is a function of measuring a holding time of a PTP packet in the hub 140, and bridging the PTP packet after adding the holding time to the PTP packet.

The time server 104 has a function of distributing (transmitting) a time. For example, the time server 104 distributes a time synchronization packet to the communication apparatuses 101*a* to 101*z*. Because the time server 104 transmits the packet, the time server 104 can be referred to as a communication apparatus.

The control terminal 180 performs control, such as operation state management and parameter setting, on blocks (the hub 140, the time server 104, and the image processing apparatus 160) included in the synchronous imaging system 100, via networks 185*a*, 185*b*, and 185*c*. Control information for performing the control is transmitted and received via the networks 185*a* to 185*c* mainly using a communication packet (hereinafter, referred to as a "control packet") defined in the Transmission Control Protocol/Internet Protocol (TCP/IP). The networks 184 and 185*a* to 185*c* correspond to Gigabit Ethernet (GbE), 10 Gigabit Ethernet (10 GbE), or 100 Gigabit Ethernet (100 GbE), which is Ethernet® that complies with an Institute of Electrical and Electronics Engineers (IEEE) standards. The networks 184 and 185*a* to 185*c* may be constructed by a combination of the InfiniBand being an interconnection, the Industrial Ethernet, and the like. In addition, the networks 184 and 185*a* to 185*c* are not limited to these and may be networks of another type.

In the present exemplary embodiment, the sensor systems 190*a* to 190*z* will be described as sensor systems 190 except in the case of designating a connection order counted from the hub 140. The same applies to internal components of the sensor systems 190. Except in the case of designating the connection order, the 26 cameras 110*a* to 110*z* will be described as cameras 110 without any distinction, and the communication apparatuses 101*a* to 101*z* will be described as communication apparatuses 101 without any distinction. In addition, when viewed from the sensor systems 190 in FIG. 1, a network interface provided at a position closer to the hub 140 is defined as being on an upstream side, and an opposite network interface is defined as being on a downstream side.

In the synchronous imaging system 100, the sensor systems 190*a* to 190*z* are connected by the daisy chains 120*a* to 120*z*. To ensure redundancy, the daisy chain connection may be duplexed.

The plurality of sensor systems 190 need not have the same configuration, and may include apparatuses of different models, for example. In the present exemplary embodiment, the description will be provided assuming that the word "image" includes both concepts of a moving image and a still image unless otherwise stated. In other words, the synchronous imaging system 100 according to the present exemplary embodiment can be applied to both the still image and the moving image.

Next, an operation of transmitting videos captured by the cameras 110 of the respective sensor systems 190 to the image processing apparatus 160 will be described. The plurality of cameras 110 of the synchronous imaging system 100 will be described using the same reference numeral, but may be different in performance or model.

After image processing to be described below is performed in a communication apparatus 101 on an image captured by a camera 110, the image is converted into a communication packet (hereinafter, referred to as an "image packet"), and the image packet is transmitted to a sensor system 190 connected on the upstream side. At the time, to efficiently transmit the image, the image packet is transmitted using a jumbo frame having a size larger than or equal to 1.5 kilobytes. In a case where the sensor system 190 receives an image packet from a sensor system 190 connected on the downstream side, the sensor system 190 transmits the image packet to a sensor system 190 connected on the upstream side, together with an image acquired by itself through image capturing. By continuing such processing and operation, all images acquired by the sensor systems 190 through image capturing are transmitted as image packets to the image processing apparatus 160 via the hub 140.

Next, an operation of the image processing apparatus 160 will be described. The image processing apparatus 160 performs processing of data acquired from the sensor systems 190. First, the image processing apparatus 160 converts a data format by reconstructing an image acquired from each of the sensor systems 190. Then, the image processing apparatus 160 stores the image in association with an identifier of a corresponding camera 110, a data type, and a frame number. Then, the image processing apparatus 160 receives designation of (an instruction for) a viewpoint from the control terminal 180, reads corresponding image data from stored information based on the designated viewpoint, and generates a virtual viewpoint image by performing rendering processing.

The image having been subjected to the rendering processing is transmitted from the image processing apparatus 160 to the user terminal 170, and displayed on the display unit of the user terminal 170. A user who operates the user terminal 170 can view an image from a viewpoint corresponding to the designation. In other words, the image processing apparatus 160 generates virtual viewpoint content that is based on captured images (multi-view images) captured by the plurality of cameras 110, and viewpoint information.

Next, processing and operations for the cameras 110 to capture images of the same subject at the same timing will be described. The time server 104 distributes a time for performing time synchronization to the sensor systems 190.

Each of the communication apparatuses 101 performs time synchronization with the time server 104 by executing a time synchronization sequence upon receiving a PTP packet transmitted by the time server 104, from a daisy-chained communication apparatus 101 connected on the upstream side. Based on time information acquired through the time synchronization sequence, a Genlock signal is transmitted to the camera 110. The camera 110 becomes able to execute image capturing based on the Genlock signal synchronized with the time server 104. With this configuration, since each of the cameras 110 included in the synchronous imaging system 100 operates using the Genlock signal synchronized with the time server 104, the cameras 110 become able to execute image capturing of the same subject at the same timing.

The time synchronization sequence executed by the time server 104 and the communication apparatus 101 is a time synchronization sequence defined in the PTP. By having the TC function and an Ordinary Clock (OC) function defined in the PTP, the communication apparatuses 101 implement time synchronization through the daisy chain connection. The OC function is a function of synchronizing a time of itself with that of the time server 104 serving as a time source using a PTP packet.

FIG. 1 illustrates the configuration in which all of the communication apparatuses 101 are daisy-chained, but a connection configuration of the communication apparatuses 101 is not limited to this. For example, the plurality of sensor systems 190 may be divided into several groups, and sensor systems 190 may be daisy-chained in each divided group. Such a configuration is useful especially in stadiums. For example, a case where a stadium has a plurality of floors, and a predetermined number of sensor systems 190 are provided on each floor (or every half round of the stadium) can be considered. In this case, input to the image processing apparatus 160 can be performed for each floor (or every half round of the stadium). Accordingly, even in a location where it is difficult to carry out wiring for connecting all the sensor systems 190 by one daisy chain, installation thereof can be simplified and flexibility of the synchronous imaging system 100 can be enhanced.

Each of the sensor systems 190 includes the camera 110 and the communication apparatus 101. Each of the sensor systems 190 may also include an audio device (for example, microphone), or a camera platform for controlling the orientation of the camera, for example. Alternatively, each of the sensor systems 190 may include one communication apparatus 101 and a plurality of cameras 110, or may include one camera 110 and a plurality of communication apparatuses 101.

The camera 110 and the communication apparatus 101 may be integrally formed. FIG. 1 illustrates the configuration in which the camera 110 and the communication apparatus 101 included in each of the sensor systems 190 are separated, but the camera 110 and the communication apparatus 101 may be provided in the same casing. Thus, the sensor systems 190 included in one synchronous imaging system 100 need not have the same configuration.

Next, the configuration of the communication apparatus 101 will be described with reference to FIG. 2. For the sake of explanatory convenience, the communication apparatus 101*b* illustrated in FIG. 1 will be described. The communication apparatus 101 (101*b*) includes a control unit 220, a storage unit 230, a communication interface (UF) unit a 280, a communication I/F unit b 270, a synchronization processing unit 240, an image transmission processing unit 210, a camera control unit 250, an image processing unit 260, and a system bus 290. The functional blocks 210 to 280 are connected to each other via the system bus 290, and can transmit and receive various types of information (control information, time information, image information, etc.).

The control unit 220 is a processing unit that controls the entire communication apparatus 101. The control unit 220 mainly performs the control of the time synchronization sequence to be executed using a PTP packet, the control of transferring a received image packet, and the control of generating an image packet based on an image captured by the camera 110 and transmitting the generated image packet. The control unit 220 may include one or a plurality of processors (central processing unit (CPU), micro-processing unit (MPU), etc.).

The storage unit 230 stores various types of information handled in the functional blocks 210 to 280. The storage unit 230 includes a semiconductor memory, such as a dynamic random access memory (DRAM), for example.

The communication I/F unit a 280 is an interface unit for connecting the communication apparatus 101*b* with the communication apparatus 101*a* connected on the upstream side via a daisy chain 120*b*. The communication I/F unit b 270 is an interface unit for connecting the communication apparatus 101*b* with the communication apparatus 101*c* connected on the downstream side via a daisy chain 120*c*. The communication I/F unit a 280 and the communication I/F unit b 270 have the same configuration and the same function. In a case where the communication apparatus 101 illustrated in FIG. 2 is the communication apparatus 101*a* connected on the most upstream side, the communication I/F unit a 280 is an interface unit for connecting the communication apparatus 101*a* with the hub 140 via a daisy chain 120*a*.

The communication I/F unit b 270 includes a clock 271 thereinside. The communication I/F unit a 280 also includes a clock 281 thereinside. The clocks 271 and 281 independently tick down. The setting and resetting of the clocks 271 and 281 are performed by the control unit 220. Alternatively, the setting and resetting of the clocks 271 and 281 may be performed by the synchronization processing unit 240.

The communication I/F unit a 280 and the communication I/F unit b 270 have a function of transmitting and receiving mainly three types of communication packet to and from the daisy chains 120*a* to 120*c*. The three types of communication packet include a control packet, an image packet, and a PTP packet.

In a case where a PTP packet is received from the daisy chain 120*c*, the communication I/F unit b 270 transfers the PTP packet to the synchronization processing unit 240. In a case where a PTP packet is received from the daisy chain 120*b*, the communication I/F unit a 280 transfers the PTP packet to the synchronization processing unit 240. If the communication I/F unit b 270 receives a PTP packet from the synchronization processing unit 240, the communication I/F unit b 270 transmits the PTP packet to the communication apparatus 101*c* via the daisy chain 120*c*. If the communication I/F unit a 280 receives a PTP packet from the synchronization processing unit 240, the communication I/F unit a 280 transmits the PTP packet to the communication apparatus 101*a* via the daisy chain 120*b*. Transmission and reception of the PTP packet between the synchronization processing unit 240 and the communication I/F unit b 270 may be executed via the storage unit 230. Transmission and reception of the PTP packet between the synchronization processing unit 240 and the communication I/F unit a 280 may also be executed via the storage unit 230. In a case where the communication apparatus 101 illustrated in FIG. 2 is the communication apparatus 101*a* connected on the most upstream side, if the communication I/F unit a 280 receives a PTP packet from the synchronization processing unit 240, the communication I/F unit a 280 transmits the PTP packet to the time server 104 via the daisy chain 120*a* and 185*c*.

Furthermore, at a timing at which a PTP packet is received from the daisy chain 120*c*, the communication I/F unit b 270 outputs time information of the clock 271 included thereinside to the synchronization processing unit 240 without using the system bus 290. In some cases, at a timing at which the communication I/F unit a 280 transmits a PTP packet to the daisy chain 120*b*, the communication I/F unit a 280 adds time information of the clock 281 to the PTP packet and transmits the PTP packet. Similarly, at a timing at which a PTP packet is received from the daisy chain 120*b*, the communication I/F unit a 280 outputs time information of the clock 281 included thereinside to the synchronization processing unit 240 without using the system bus 290. In some cases, at a timing at which the communication I/F unit b 270 transmits a PTP packet to the daisy chain 120*c*, the communication I/F unit b 270 adds time information of the clock 271 to the PTP packet and transmits the PTP packet.

In a case where the communication I/F unit b 270 receives an image packet from the daisy chain 120*c*, the communication I/F unit b 270 transfers the image packet to the image transmission processing unit 210. If the communication I/F unit a 280 receives an image packet from the image transmission processing unit 210, the communication I/F unit a 280 transmits the image packet to the communication apparatus 101*a* via the daisy chain 120*b*. In a case where the communication apparatus 101 illustrated in FIG. 2 is the communication apparatus 101*a* connected on the most upstream side, if the communication I/F unit a 280 receives an image packet from the image transmission processing unit 210, the communication I/F unit a 280 transmits the image packet to the image processing apparatus 160.

In a case where the communication I/F unit a 280 receives a control packet from the daisy chain 120*b*, the communication I/F unit a 280 delivers control information to the control unit 220 by transferring the control packet to the storage unit 230. In a case where the communication I/F unit a 280 transmits a response signal of the control packet to the control terminal 180 and other communication apparatuses 101 on a network, in accordance with an instruction from the control unit 220, the communication I/F unit a 280 receives a control packet via the storage unit 230 and transmits the control packet to the daisy chain 120*b*.

The synchronization processing unit 240 is a functional block that performs control of synchronizing a time of the communication apparatus 101 with a time of the time server 104. The synchronization processing unit 240 also has a function of generating a synchronization signal that enables the camera 110 connecting to the communication apparatus 101 to execute synchronous image capturing. The synchronization processing unit 240 also has a function of an internal clock 241 to generate a synchronization signal. The synchronization processing unit 240 also includes a counter 242 thereinside. The counter 242 counts the number of communication apparatuses 101 connecting to the communication I/F unit b 270. A method for synchronizing a time with the time of the time server 104 will be described below with reference to FIGS. 3A and 3B.

Further, the synchronization processing unit 240 issues a notification of an execution status of the time synchronization sequence that uses a PTP packet to the image transmission processing unit 210. The notification is issued in step S504 or S512 illustrated in FIG. 5. A generation method of an image packet to be generated in the image transmission processing unit 210 depending on the execution status of the time synchronization sequence will be described below with reference to FIG. 4.

The camera control unit 250 outputs a Genlock signal and a Time code to the camera 110. The Genlock signal and the Time code are generated based on a synchronization signal received from the synchronization processing unit 240.

The camera 110 performs image capturing in synchronization with the Genlock signal, and outputs captured data to the image processing unit 260 together with the received Time code.

From the captured data received from the camera 110, the image processing unit 260 obtains image data having been subjected to image processing (extraction of a background portion or a foreground portion, etc.) necessary for generating a virtual viewpoint video and transfers the image data to the image transmission processing unit 210. In the image data, one piece of image data includes address information for each image type, such as a foreground image and a background image, and information such as a data size and a frame number. Then, image data to be acquired by the image transmission processing unit 210 becomes image data of an image captured at a timing synchronized with a synchronization signal (Genlock signal) generated based on a time synchronized with the time server 104.

The image transmission processing unit 210 mainly has a function of generating an image packet from the image data received from the image processing unit 260, and transferring the image packet to the communication I/F unit a 280. The image transmission processing unit 210 also has a function of transferring an image packet received from the communication I/F unit b 270 to the communication I/F unit a 280. In addition, the image transmission processing unit 210 also has a function of generating an image packet with a predetermined data size upon receiving the notification of an execution status of the time synchronization sequence from the synchronization processing unit 240. In addition, the image transmission processing unit 210 is connected to the system bus 290, and functional blocks (211 to 214) included in the image transmission processing unit 210 operate based on the control of the control unit 220.

Next, the functional blocks (211 to 214) included in the image transmission processing unit 210 will be described.

The setting unit 211 has a function of storing, thereinside, setting information about the functional blocks (212 to 214) in the image transmission processing unit 210 and notifying the functional blocks (212 to 214) of the setting information. The setting information is mainly written in the setting unit 211 from the control unit 220 via the system bus 290. Part of the setting information is set based on the notification from the synchronization processing unit 240. The setting unit 211 designates (sets) a division size of an image packet (payload).

The image packet generation unit 214 converts image data received from the image processing unit 260 into an image packet that can be transmitted and received via the daisy chains 120*a* to 120*c*, and transfers the image packet to the transfer intermediation unit 213. The transfer is suspended until the transfer intermediation unit 213 enters a receivable state, and the image packet generation unit 214 is brought into a standby state. Main processing to be executed by the image packet generation unit 214 is processing of generating an image packet in conformity with a communication protocol that enables transmission and reception on networks. An image packet includes a communication header and a payload. The communication header includes address information and communication protocol information to be used, in accordance with a format defined in a communication protocol. The payload is obtained by dividing the image data received from the image processing unit 260 into a size based on the designation made by the setting unit 211. The image packet generation unit 214 generates an image packet by combining the payload obtained by dividing image data and the created communication header.

The transfer intermediation unit 213 has a function of selecting either an image packet transmitted from the communication I/F unit b 270, or an image packet transmitted from the image packet generation unit 214, as an image packet to be transferred to the transfer processing unit 212. In a normal state, the transfer intermediation unit 213 performs control of preferentially transferring an image packet transmitted from the communication I/F unit b 270 to the transfer processing unit 212, and transferring an image packet transmitted from the image packet generation unit 214 after the transfer of all image packets transmitted from the communication I/F unit b 270 is completed. An image packet to be preferentially transferred can be dynamically switched based on the designation made by the setting unit 211.

The transfer processing unit 212 has a function of performing division processing on an image packet and rewriting of a communication header as necessary on an image packet transmitted from the transfer intermediation unit 213. For example, as for an image packet transmitted from the communication apparatus 101*c* via the communication I/F unit b 270, the transfer processing unit 212 rewrites address information in the communication header into address information of the communication apparatus 101*a* connecting to the communication I/F unit a 280. The transfer processing unit 212 also performs the division processing on the image packet in such a manner that each divided payload has a payload length designated by the designation made by the setting unit 211. In this case, the transfer processing unit 212 generates communication headers as many as the number of divided payloads, and generates new image packets by combining the generated communication headers with the divided payloads.

Figure 2:
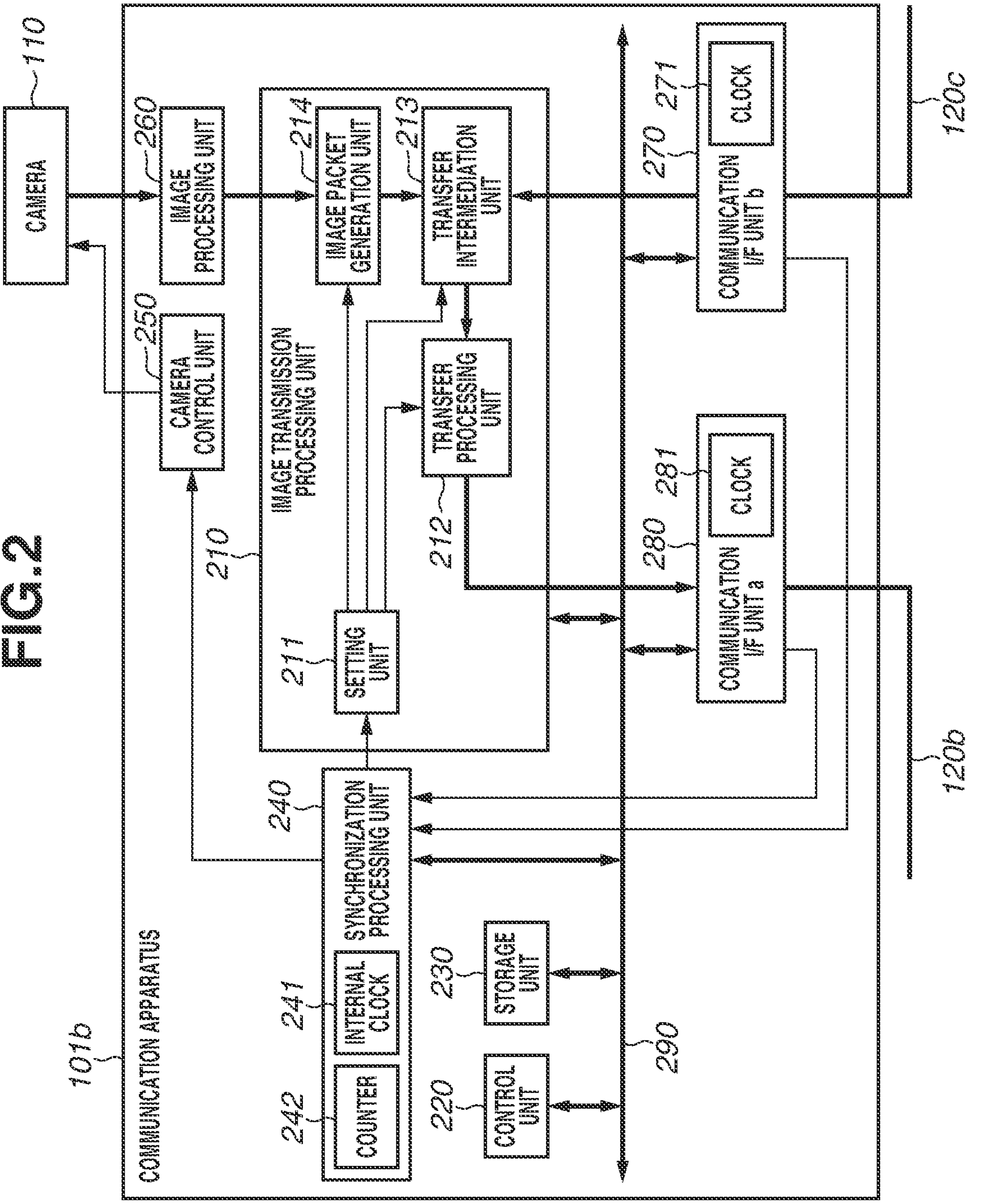
FIG. 2 is a functional block diagram of a communication apparatus.

Part or all of the image transmission processing unit 210, the synchronization processing unit 240, the camera control unit 250, and the image processing unit 260 that are illustrated in FIG. 2 may be installed on the communication apparatus 101 as software. Alternatively, part or all of the image transmission processing unit 210, the synchronization processing unit 240, the camera control unit 250, and the image processing unit 260 that are illustrated in FIG. 2 may be installed on the communication apparatus 101 as dedicated hardware, such as an application specific integrated circuit (ASIC) or a programmable logic array (PLA). In a case where part or all of the image transmission processing unit 210, the synchronization processing unit 240, the camera control unit 250, and the image processing unit 260 that are illustrated in FIG. 2 are installed as hardware, part or all of the image transmission processing unit 210, the synchronization processing unit 240, the camera control unit 250, and the image processing unit 260 that are illustrated in FIG. 2 may be installed as a dedicated hardware module of each component or a dedicated hardware module of several components.

Figure 3B:
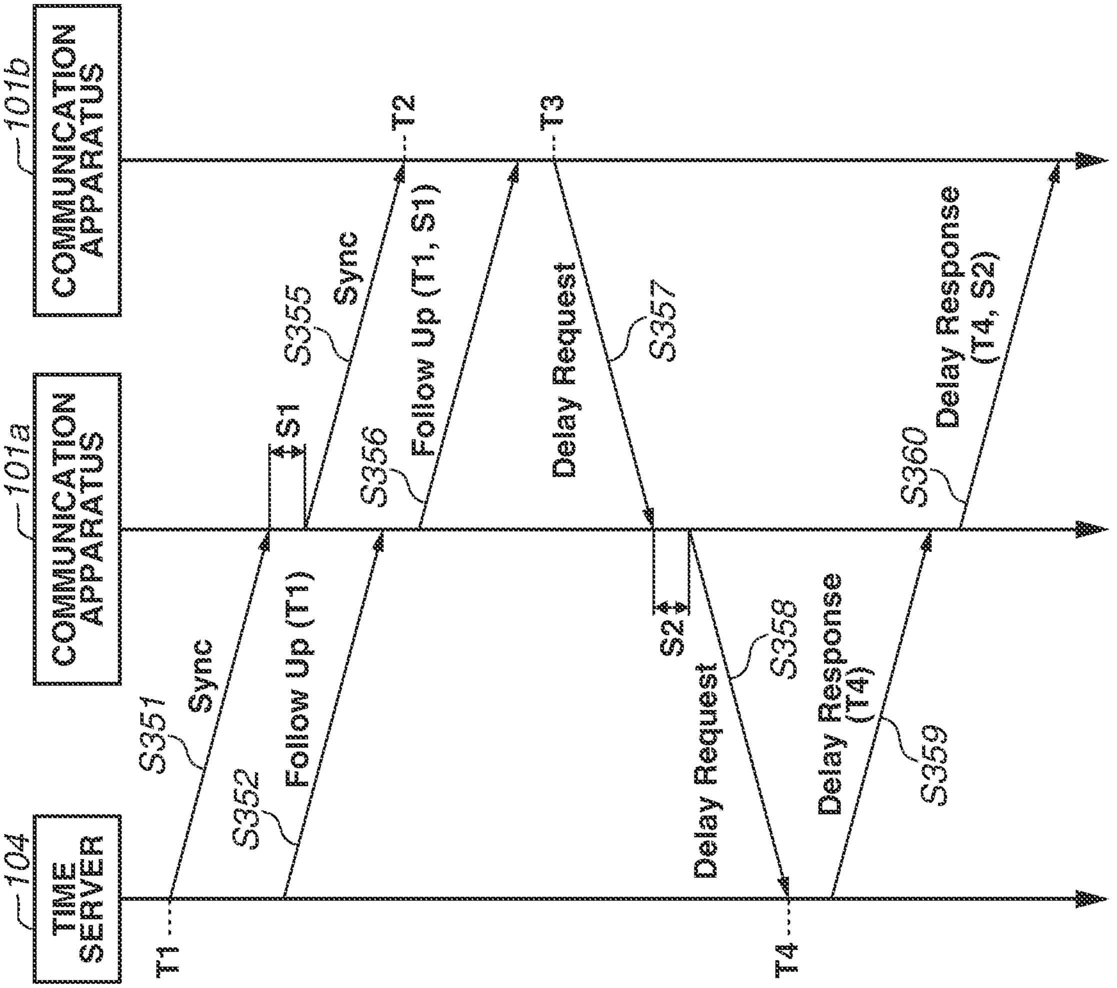
FIGS. 3A and 3B are time synchronization sequence diagrams.
Figure 3A:
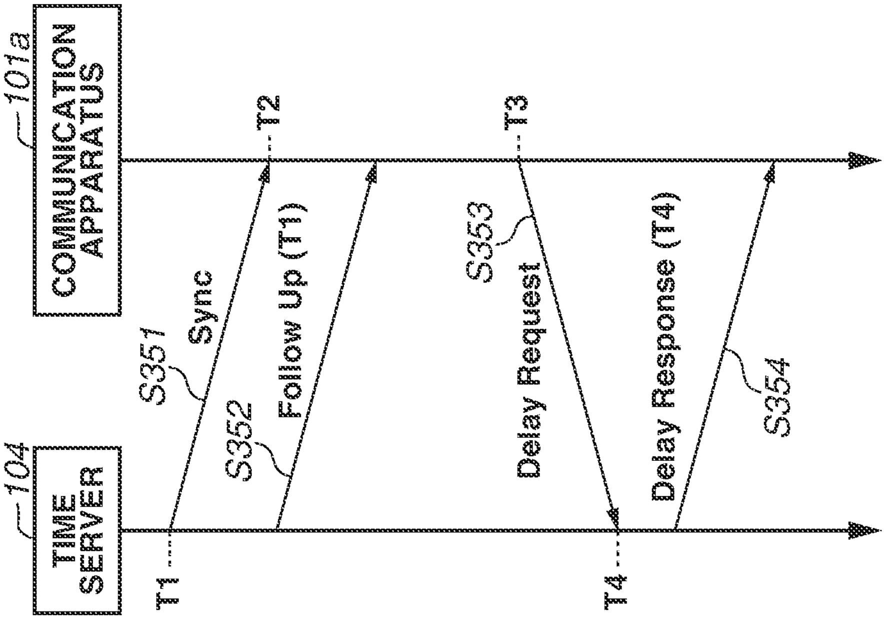

FIGS. 3A and 3B each illustrate a time synchronization sequence to be executed in the synchronous imaging system 100. In FIGS. 3A and 3B, "S" stands for step. FIG. 3A illustrates a time synchronization sequence to be executed between the communication apparatus 101*a* and the time server 104 using a PTP packet. FIG. 3B illustrates a time synchronization sequence to be executed between the communication apparatus 101*b* and the time server 104 using a PTP packet. In FIGS. 3A and 3B, the illustration of the hub 140 having the TC function is omitted for sake of simplicity of description.

First, FIG. 3A will be described. In step S351, the time server 104 initially transmits a Sync packet to the communication apparatus 101*a*. In a case where synchronization processing of the time server 104 is operated in two steps, in step S352, the time server 104 transmits a Follow Up packet. In step S353, the communication apparatus 101*a* that has received the Sync and Follow Up packets transmits a Delay Request packet to the time server 104 in executing the synchronization processing.

In step S354, the time server 104 that has received the Delay Request packet transmits a Delay Response packet to the communication apparatus 101*a*.

Here, a time T1 indicates a time at which the time server 104 has transmitted the Sync packet, and a time T2 indicates a time at which the communication apparatus 101*a* has received the Sync packet. In addition, a time T3 indicates a time at which the communication apparatus 101*a* has transmitted the Delay Request packet, and a time T4 indicates a time at which the time server 104 has received the Delay Request packet. The time T1 is stored in the Follow Up packet, and the time T4 is stored in the Delay Response packet.

The reception time T2 of the Sync packet and the transmission time T3 of the Delay Request packet can be acquired through the following procedure. At a timing at which the Sync packet is received, the communication I/F unit a 280 notifies the synchronization processing unit 240 of time information of the clock 281 included thereinside. By the notification, the synchronization processing unit 240 can acquire the time T2. The same applies to the transmission time T3. At a timing at which the Delay Request packet is transmitted from the communication apparatus 101*a* to the time server 104, the communication I/F unit a 280 notifies the synchronization processing unit 240 of time information of the clock 281 included thereinside. By the notification, the synchronization processing unit 240 can acquire the transmission time T3.

By executing the above-described time synchronization sequence, the communication apparatus 101*a* can acquire the four times T1 to T4. Based on the four times T1 to T4, an average transmission path delay between the time server 104 and the communication apparatus 101*a*, and a time difference between the time server 104 and the communication apparatus 101*a* (i.e., a time correction amount of the communication apparatus 101*a*) can be obtained as follows.

$$\text{Average transmission path delay}=((T4-T1)-(T3-T2))/2$$

$$\text{Time correction amount}=((T2-T1)-(T4-T3))/2$$

Because the time correction amount calculated as described above is an offset amount of the communication apparatus 101*a* with respect to the time server 104, by adjusting a progress amount of a time held by the communication apparatus 101*a* in such a manner that the time correction amount becomes 0, time synchronization with the time server 104 is achieved. This corresponds to the OC function.

Next, FIG. 3B will be described. FIG. 3B illustrates a case where the communication apparatus 101*a* operates in an End to End (E2E) mode of the TC function in the transmission and reception of a PTP packet to be executed between the time server 104 and the communication apparatus 101*b*.

Similarly to FIG. 3A, the time server 104 transmits Sync, Follow Up, and Delay Response packets, and the communication apparatus 101*a* transmits a Delay Request packet. In addition, similarly to the operations of the communication apparatus 101*a* in FIG. 3A, the communication apparatus 101*b* receives Sync, Follow Up, and Delay Response packets, and transmits a Delay Request packet.

FIG. 3B differs from FIG. 3A in that, in step S355, the communication apparatus 101*a* transfers the Sync packet received from the time server 104 to the communication apparatus 101*b*, and calculates a time S1 for which the Sync packet is held in the communication apparatus 101*a*. Then, in step S356, the communication apparatus 101*a* adds information regarding the time S1 to a Follow Up packet received next in step S352, and transmits the Follow Up packet to the communication apparatus 101*b*. The processing of adding the information regarding the time S1 to the Follow Up packet is executed by the communication apparatus 101*a* having the TC function.

In step S358, when the communication apparatus 101*a* transmits a Delay Request packet received from the communication apparatus 101*b* in step S357 to the time server 104, the communication apparatus 101*a* calculates a holding time S2 of the Delay Request packet in the communication apparatus 101*a*. In step S360, the communication apparatus 101*a* adds information regarding the calculated time S2 to a Delay Response packet received from the time server 104 in step S359, and transmits the Delay Response packet to the communication apparatus 101*b*. Accordingly, an average transmission path delay between the time server 104 and the communication apparatus 101*b*, and a time correction amount can be obtained as follows.

$$\text{Average transmission path delay}=((T2-T3)+(T4-T1)-S1-S2)/2$$

$$\text{Time correction amount}=(T2-T1)-\text{average transmission path delay}-S1$$

Because the time correction amount calculated as described above is an offset amount of the communication apparatus 101*b* with respect to the time server 104, by adjusting a progress amount of a time held by the communication apparatus 101*b* in such a manner that the time correction amount becomes 0, time synchronization with the time server 104 is achieved.

Figure 4:
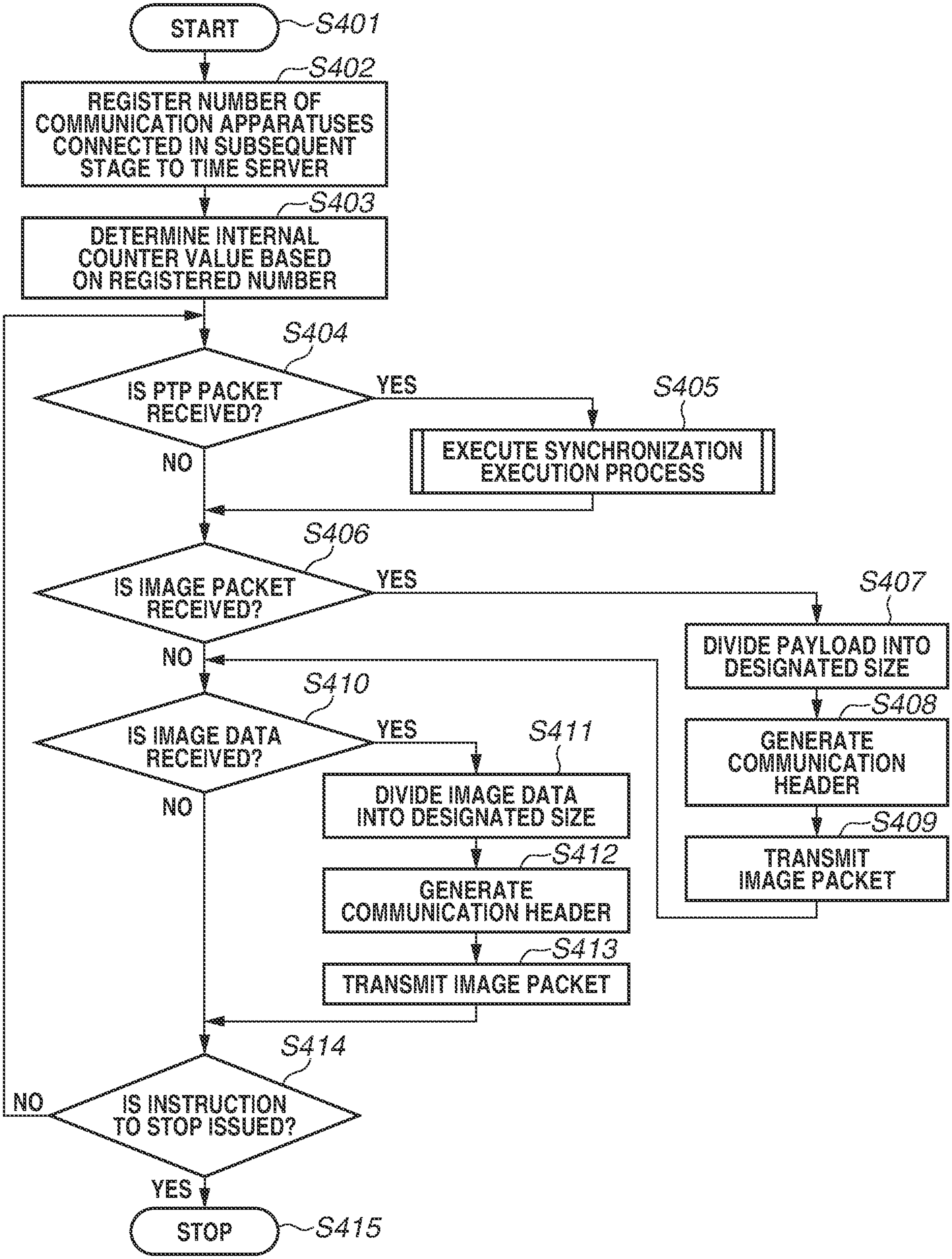
FIG. 4 is a flowchart illustrating an operation of a communication apparatus.

Next, processing and operations to be performed by the communication apparatus 101 (101*a*) will be described with reference to FIG. 4. FIG. 4 illustrates a flow of operations of the communication apparatus 101*a* that are to be performed in a case where synchronous image capturing is executed in the synchronous imaging system 100, using operations of the communication apparatus 101*a* as a representative example.

In step S401, the processing of the flowchart starts. In step S401, for example, the synchronous imaging system 100 is in a state in which preparation for the synchronous image capturing as a whole system has been completed.

In step S402, the number of communication apparatuses 101*b* to 101*z* connected in a subsequent stage (on the downstream side of) the communication apparatus 101*a* is registered in the storage unit 230 of the communication apparatus 101*a*. Information regarding the number of communication apparatuses 101*b* to 101*z* connected in a subsequent stage to the communication apparatus 101*a* is acquired from the control terminal 180. Specifically, a control packet transmitted from the control terminal 180 is received by the communication I/F unit a 280 of the communication apparatus 101*a*, and information regarding the number of communication apparatuses, which is included in the control packet, is stored in the storage unit 230 by the control unit 220 of the communication apparatus 101*a*. Alternatively, the communication apparatus 101*a* may transmit a control packet to the subsequent communication apparatuses 101*b* to 101*z* using the communication I/F unit b 270, and acquire information regarding the number of communication apparatuses based on a response to the control packet.

In step S403, the information regarding the number of communication apparatuses that has been acquired (registered) in step S402 is set in the synchronization processing unit 240. Specifically, based on the number of communication apparatuses that is registered in the storage unit 230 (registered number), a count of the counter 242 (counter value) inside the synchronization processing unit 240 is determined. The information regarding the number of communication apparatuses is set in the synchronization processing unit 240 by the control unit 220.

In step S404, it is determined whether the communication apparatus 101*a* has received a PTP packet (time synchronization packet). In other words, a route is selected depending on whether a PTP packet has been received. In a case where the communication apparatus 101*a* has received a PTP packet (YES in step S404), the processing proceeds to step S405. In a case where the communication apparatus 101*a* has not received a PTP packet (NO in step S404), the processing proceeds to step S406. The determination in step S404 is executed in a case where the communication I/F unit a 280 or the communication I/F unit b 270 of the communication apparatus 101*a* has received a PTP packet. The received communication packet is determined to be a PTP packet by the control unit 220 analyzing the received communication packet and recognizing the communication packet as a PTP packet.

Step S405 is an execution process of the time synchronization sequence defined in the PTP. Details will be described below with reference to FIG. 5.

In step S406, it is determined whether the communication apparatus 101*a* has received an image packet from the outside (another communication apparatus). In other words, a route is selected depending on whether an image packet has been received. In a case where the communication apparatus 101*a* has received an image packet (YES in step S406), the processing proceeds to step S407. More specifically, in a case where the communication I/F unit b 270 of the communication apparatus 101*a* has received an image packet (YES in step S406), the processing proceeds to step S407. In a case where the communication I/F unit b 270 has not received an image packet (NO in step S406), the processing proceeds to step S410. The received communication packet is determined to be an image packet by the control unit 220 analyzing the received communication packet and recognizing the communication packet as an image packet.

In step S407, a payload portion of the image packet received by the communication I/F unit b 270 is divided into a designated payload length. If the designated payload length is the same as a payload length of the received image packet, the division is not performed. The processing in step S407 is executed by the transfer processing unit 212. The transfer processing unit 212 performs division processing of the image packet in such a manner that each divided payload has the payload length designated (set) by the setting unit 211.

In step S408, a communication header corresponding to each payload (divided image packet) generated by the division processing in step S407 is generated. Communication headers are generated as many as the number of divided payloads, and new image packets are generated by combining the communication headers with the divided payloads.

The communication headers generated in step S408 differ from a communication header of the image packet received by the communication I/F unit b 270 (the communication header is rewritten). The processing in step S408 is executed by the transfer processing unit 212. Even in a case where the payload of the image packet is not divided in step S407, the communication header is rewritten. For example, as for an image packet transmitted from the communication apparatus 101*b* connected on the downstream side and received by the communication I/F unit b 270, address information in the communication header is rewritten to address information of the image processing apparatus 160 connecting to the communication I/F unit a 280.

In step S409, the image packet generated in step S408 is transmitted from the communication I/F unit a 280 to the daisy chain 120*b* on the upstream side. The processing in step S409 is processing of transferring the image packet generated in step S408 to the image processing apparatus 160 under the control of the control unit 220.

In step S410, it is determined whether the image packet generation unit 214 of the communication apparatus 101*a* has received image data (captured image data of the camera 110*a*). In other words, a route is selected depending on whether the image packet generation unit 214 of the communication apparatus 101*a* has received image data from the camera 110*a* associated with the communication apparatus 101*a*. In a case where the image packet generation unit 214 has received image data (YES in step S410), the processing proceeds to step S411. More specifically, in a case where the image packet generation unit 214 of the communication apparatus 101*a* has acquired image data from the image processing unit 260 (YES in step S410), the processing proceeds to step S411. The determination in step S410 is made depending on whether the control unit 220 has recognized that the image packet generation unit 214 has received image data. In a case where the image packet generation unit 214 has not received (acquired) image data (NO in step S410), the processing proceeds to step S414.

In step S411, the image data received by the image packet generation unit 214 from the image processing unit 260 is divided into the designated payload length. If the designated payload length is the same as the length of the received image data, the division is not performed. The processing in step S411 is executed by the image packet generation unit 214. The image packet generation unit 214 performs division processing of the image data in such a manner that each divided image data has the payload length designated based on the setting made by the setting unit 211.

In step S412, pieces of image data (divided image packets) obtained by the division executed in step S411 is regarded as payloads of the image packet, and communication headers respectively corresponding to the payloads are generated. The communication headers are generated as many as the number of divided pieces of image data, and new image packets are generated by combining the communication headers with the divided pieces of image data regarded as the payloads. The processing in step S412 is executed by the image packet generation unit 214. Even in a case where the payload of the image packet is not divided in step S411, one communication header is generated (the communication header is rewritten).

In step S413, the image packet generated in step S412 is transmitted from the communication I/F unit a 280 to the daisy chain 120*b* on the upstream side. The processing in step S413 is processing of transferring the image packet generated in step S412 to the image processing apparatus 160 under the control of the control unit 220.

In step S414, it is determined whether an instruction to stop synchronous image capturing of the synchronous imaging system 100 has been issued. In other words, a route is selected depending on whether an instruction to stop synchronous image capturing has been issued. If an instruction to stop synchronous image capturing has been issued in response to an instruction (signal) from the control terminal 180 (YES in step S414), the processing proceeds to step S415. If an instruction to stop synchronous image capturing has not been issued (NO in step S414), the processing returns to step S404.

In step S415, the processing of the flowchart ends. Step S415 indicates a state in which synchronous image capturing has ended in the synchronous imaging system 100 as a whole system.

Next, the execution process of the time synchronization sequence (step S405 of FIG. 4) in the operation flowchart of the communication apparatus 101 will be described with reference to FIG. 5.

In step S501, the processing of this flowchart starts. More specifically, in a case where it is determined in step S404 of FIG. 4 that the communication apparatus 101*a* has received a PTP packet (YES in step S404), the processing of this flowchart starts.

In step S502, it is determined whether the received PTP packet is a Sync packet transmitted from the time server 104. In other words, a route is selected depending on whether the received PTP packet is a Sync packet transmitted from the time server 104. If the PTP packet received by the communication apparatus 101*a* is a Sync packet transmitted from the time server 104 (YES in step S502), the processing proceeds to step S503. If the PTP packet received by the communication apparatus 101*a* is not a Sync packet transmitted from the time server 104 (NO in step S502), the processing proceeds to step S508. The communication I/F unit a 280 detects that the received PTP packet is a Sync packet, and notifies the synchronization processing unit 240 of a detection result, so that the determination is made.

In step S503, a value of the counter 242 included in the synchronization processing unit 240 is set to a predetermined value. In step S403 of FIG. 4, information regarding the number of communication apparatuses 101 connected on the downstream side of the communication apparatus 101*a* is already registered in the synchronization processing unit 240. In step S503, the information regarding the number of communication apparatuses 101 is set as a counter value.

In step S504, the communication apparatus 101*a* transmits a Delay Request packet to the time server 104. The processing in step S504 corresponds to the processing in step S353 illustrated in FIG. 3A. The Delay Request packet is transmitted from the communication I/F unit a 280 to the time server 104 under the control of the control unit 220.

In step S505, it is determined whether the counter value in the synchronization processing unit 240 is 0. In other words, a route is selected depending on whether the counter value in the synchronization processing unit 240 is 0. If the counter value in the synchronization processing unit 240 is 0 (YES in step S505), the processing proceeds to step S508. If the counter value in the synchronization processing unit 240 is not 0 (NO in step S505), the processing proceeds to step S506. The case where the counter value is not 0 means that at least one communication apparatus 101 is connected on the downstream side of the communication apparatus 101*a*.

In step S506, a size of an image packet to be transmitted by the synchronization processing unit 240 to the setting unit 211 in the image transmission processing unit 210 is set. By designating a size of a payload portion of the image packet, the size of the image packet is designated (set). In this step, a smaller size compared with a size of a payload portion of an image packet in a normal state is designated. After the designation (setting) of reducing the size of the payload portion is performed, the setting unit 211 notifies the image packet generation unit 214 and the transfer processing unit 212 of the payload size, and a plurality of image packets (divided image packets) is generated by dividing the image packet in the normal state.

In step S507, the communication apparatus 101*a* transmits a Sync packet to the communication apparatus 101*b* on the downstream side. The processing in step S507 corresponds to the processing in step S355 illustrated in FIG. 3B. The processing in step S507 is processing of transmitting the Sync packet in step S355 of FIG. 3B from the communication I/F unit b 270 to the communication apparatus 101*b* on the downstream side by the control unit 220.

In step S508, it is determined whether the received PTP packet is a Delay Request packet transmitted from the communication apparatus 101*b* on the downstream side. In other words, a route is selected depending on whether the received PTP packet is a Delay Request packet transmitted from the communication apparatus 101*b*. If the PTP packet received by the communication apparatus 101*a* is a Delay Request packet transmitted from the communication apparatus 101*b* (YES in step S508), the processing proceeds to step S509. If the PTP packet received by the communication apparatus 101*a* is not a Delay Request packet transmitted from the communication apparatus 101*b* (NO in step S508), the processing proceeds to step S513. The communication I/F unit b 270 detects that the received PTP packet is a Delay Request packet, and notifies the synchronization processing unit 240 of a detection result, so that the determination is made.

In step S509, the value of the counter 242 (counter value) included in the synchronization processing unit 240 is decremented (decreased). In step S403 of FIG. 4, information regarding the number of communication apparatuses 101 connected on the downstream side of the communication apparatus 101*a* is already registered in the synchronization processing unit 240. In step S509, a value of the information regarding the number of communication apparatuses 101 is decreased.

Next, a reason why a counter value is decremented will be described. Receiving a Delay Request packet means that a Delay Request packet has been transmitted from any of the communication apparatuses 101 on the downstream side. Accordingly, it can be determined that the counter value is the same number as the number of communication apparatuses 101 that have not received a Delay Request packet.

As another method (without performing processing of decrementing the counter value), the counter value may be rewritten to 0 after a predetermined time has elapsed since the counter value is set to a value other than 0 using the internal clock 241 included in the synchronization processing unit 240. Whether the predetermined time has elapsed is determined based on whether a time pre-registered in the synchronization processing unit 240 by the control unit 220 has elapsed since the counter value is set to a value other than 0.

In step S510, it is determined whether the counter value in the synchronization processing unit 240 is 0. In other words, a route is selected depending on whether the counter value in the synchronization processing unit 240 is 0. If the counter value in the synchronization processing unit 240 is 0 (YES in step S510), the processing proceeds to step S511. If the counter value in the synchronization processing unit 240 is not 0 (NO in step S510), the processing proceeds to step S512. In this step, the counter value being 0 means that the number of communication apparatuses 101 that have not received a Delay Request packet is 0, as described in step S509. Specifically, if it is determined in step S510 that the counter value is 0, it is determined that the transmission in step S357 of FIG. 3B from all the communication apparatuses 101 on the downstream side has been completed. If the counter value is 0, it can be determined that all predetermined packets (Delay Request packets) for time synchronization have been received from the apparatuses (the communication apparatuses 101*b* to 101*z*) connected to the communication apparatus 101*a*.

In step S511, a size of an image packet to be transmitted by the synchronization processing unit 240 to the setting unit 211 in the image transmission processing unit 210 is set. By designating a size of a payload portion of the image packet, the size of the image packet is designated. In this step, the size of the payload portion that has been set to the small size is designated to the size in the normal state (returned to the size in the normal state). After the designation (setting) in such a manner as to increase the size of the payload portion is performed, the setting unit 211 notifies the image packet generation unit 214 and the transfer processing unit 212 of the payload size, and an image packet having the size in the normal state is generated.

In step S512, the communication apparatus 101*a* transmits a Delay Request packet to the time server 104. The processing in step S512 corresponds to the processing in step S358 illustrated in FIG. 3B. In the processing, a Delay Request packet in step S358 of FIG. 3B is transmitted by the control unit 220 from the communication I/F unit a 280 to the time server 104.

In step S513, it is determined whether the received PTP packet is a Delay Response packet transmitted from the time server 104. In other words, a route is selected depending on whether the received PTP packet is a Delay Response packet transmitted from the time server 104. If the PTP packet received by the communication apparatus 101*a* is a Delay Response packet transmitted from the time server 104 (YES in step S513), the processing proceeds to step S514. If the PTP packet received by the communication apparatus 101*a* is not a Delay Response packet transmitted from the time server 104 (NO in step S513), the processing proceeds to step S516. The communication I/F unit a 280 detects that the received PTP packet is a Delay Response packet, and notifies the synchronization processing unit 240 of a detection result, so that the determination is made. The transmission of the Delay Response packet corresponds to the processing in step S359 of FIG. 3B.

In step S514, it is determined whether the counter value in the synchronization processing unit 240 is 0. In other words, a route is selected depending on whether the counter value in the synchronization processing unit 240 is 0. If the counter value in the synchronization processing unit 240 is 0 (YES in step S514), the processing proceeds to step S516.

If the counter value in the synchronization processing unit 240 is not 0 (NO in step S514), the processing proceeds to step S515.

In step S515, the communication apparatus 101*a* transmits a Delay Response packet to the communication apparatus 101*b* on the downstream side. The processing in step S515 corresponds to the processing in step S360 illustrated in FIG. 3B. The processing in step S515 is processing of transmitting a Delay Response packet in step S360 of FIG. 3B from the communication I/F unit b 270 to the communication apparatus 101*b* on the downstream side by the control unit 220.

In step S516, the processing of the flowchart ends. Step S516 indicates a state in which the processing in step S405 of FIG. 4 has ended.

Figure 5:
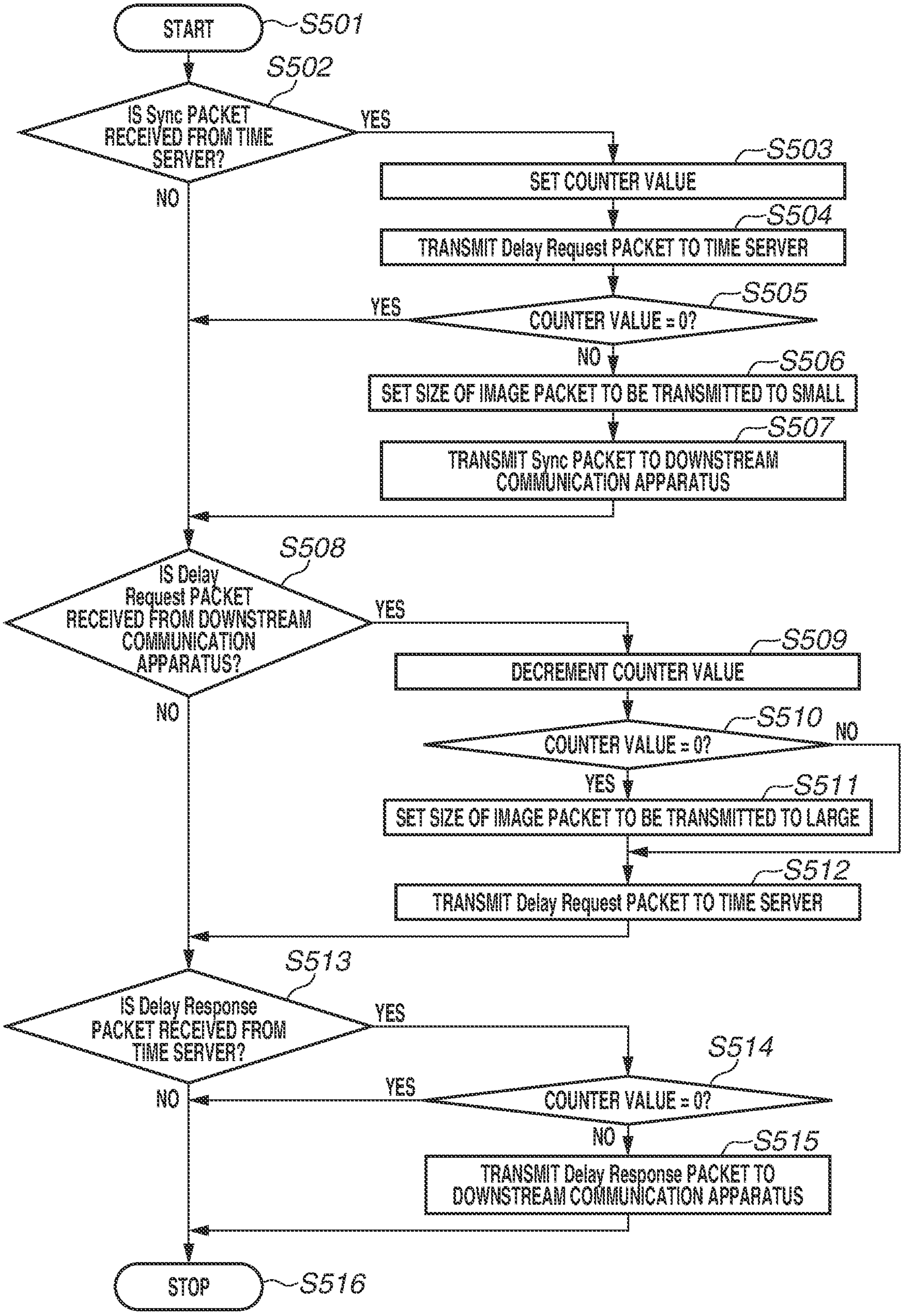
FIG. 5 is a flowchart illustrating an operation of a communication apparatus performed during execution of a time synchronization sequence.

In steps S506 and S511 of FIG. 5, the processing of changing the size of an image packet to be transmitted from the communication apparatus 101*a* is executed. Then, during a period from the time when the processing in step S506 is executed to the time when the processing in step S511 is executed, the control of reducing the size of the image packet to be transmitted by the communication apparatus 101*a* is executed. In other words, during a period from the time when the communication apparatus 101*a* has received a Sync packet to the time when the communication apparatus 101*a* receives Delay Request packets from all the communication apparatuses 101 connected on the downstream side, the control of reducing the size of the image packet is executed.

Figure 6:
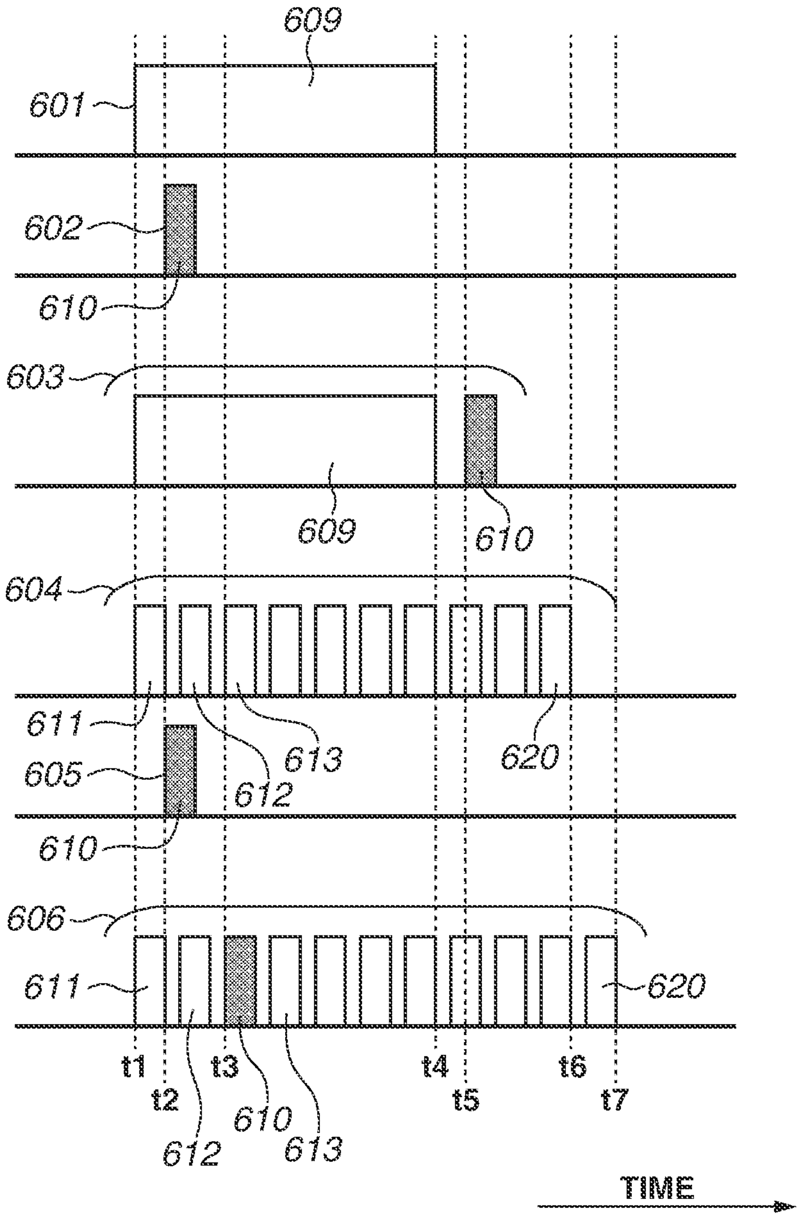
FIG. 6 is a transfer timing diagram of a precision time protocol (PTP) packet.

FIG. 6 illustrates a transfer timing of a PTP packet (Delay Request packet) according to the present exemplary embodiment. The description will be provided using the communication apparatus 101*a* of the synchronous imaging system 100 as an example. FIG. 6 illustrates a case where a transmission timing of a Delay Request packet (step S358), which is a PTP packet, overlaps a period of transfer of an image packet in the communication apparatus 101*a*. A time elapses in an arrow direction illustrated in FIG. 6, and times t1 to t7 indicate times of timings indicated by dotted lines.

A transmission time 601 indicates a transmission time period of an image packet (image packet having a normal size) 609 in the communication apparatus 101*a* in a case where the division processing of an image packet according to the present exemplary embodiment is not executed. In a period from the times t1 to t4, the image packet 609 having the normal size is being transferred. This corresponds to the case of transmitting the undivided image packet 609 in steps S409 and S413 of FIG. 4 (image packet in the case where the division processing of an image packet is not performed in steps S407 and S411).

A timing 602 indicates an occurrence of a transmission request of a Delay Request packet 610 (step S358) issued at the timing of the time t2 in the communication apparatus 101*a* in the state of the transmission time 601 (during image packet transmission). The timing 602 indicates a timing at which the synchronization processing unit 240 generates the Delay Request packet 610 (step S358) and transfers the Delay Request packet 610 to the communication I/F unit a 280 to transmit the Delay Request packet 610 to the daisy chain 120*b*, to execute the time synchronization sequence illustrated in FIG. 3.

A transmission time 603 indicates a time period during which the image packet 609 and a Delay Request packet 610 are transmitted from the communication I/F unit a 280 of the communication apparatus 101*a* to the daisy chain 120*b*. Because the transmission of the image packet 609 cannot be interrupted halfway, it is indicated that the Delay Request packet 610 (step S358) is transmitted at the timing of the time t5 that comes after the transmission of the image packet 609 ends.

With regard to the transmission time 601, the timing 602, and the transmission time 603, since the transmission of the image packet 609 cannot be interrupted halfway in the communication apparatus 101*a*, arrival of the Delay Request packet 610 at the time server 104 serving as a transmission destination is delayed by a time period corresponding to a time period from the time t2, at which the transmission request is issued, to the time t5.

A transmission time 604 indicates a transmission time period of an image packet in the communication apparatus 101*a* in a case where the division processing of an image packet according to the present exemplary embodiment has been executed. Because it is determined that the time synchronization sequence is executed upon reception of a Sync signal, it is indicated that the image packet 609 is preliminarily divided and transferred. Divided image packets 611 to 620 indicate divided image packets obtained by dividing the image packet 609.

The transmission time 604 indicates that the transmission of the first divided image packet 611 is started at the time t1, and the transmission of the last divided image packet 620 ends at the time t6. This corresponds to the case of transmitting divided image packets in steps S409 and S413 illustrated in FIG. 4 (image packets in a case where the division processing of an image packet has been performed in steps S407 and S411).

A timing 605 indicates an occurrence of a transmission request of the Delay Request packet 610 (step S358) issued at the timing of the time t2 in the communication apparatus 101*a* in the state of the transmission time 604. Similarly to the timing 602, the timing 605 indicates a timing at which the synchronization processing unit 240 generates the Delay Request packet 610 and transfers the Delay Request packet 610 to the communication I/F unit a 280 to transmit the Delay Request packet 610 to the daisy chain 120*b*.

A transmission time 606 indicates a time period during which the image packets 611 to 620 and the Delay Request packet 610 (step S358) are transmitted from the communication I/F unit a 280 of the communication apparatus 101*a* to the daisy chain 120*b*. In the transmission time 606, while the transmission of image packets cannot be interrupted halfway, since the image packets are transmitted in a divided manner, it is indicated that the Delay Request packet 610 (step S358) is transmitted at the timing of the time t3, which is a timing of an intermission of the transmission of image packets.

With regard to the transmission time 604, the timing 605, and the transmission time 606, while the transmission of image packets cannot be interrupted halfway in the communication apparatus 101*a* according to the present exemplary embodiment, since the image packets are transmitted in a divided manner, the Delay Request packet 610 (step S358) can be transmitted during the intermission of the transmission.

More specifically, the Delay Request packet 610 can be transmitted between the divided image packets 612 and 613. Thus, the arrival of the Delay Request packet 610 (step S358) at the time server 104 serving as a transmission destination is delayed only by a time period corresponding to a time period from the time t2, at which the transmission request is issued, to the time t3. In other words, it is indicated that, according to the present exemplary embodiment, the delay of an arrival time at a transmission destination (the time server 104) of the Delay Request packet 610 is reduced from the time t5 to the time t3.

The communication apparatus 101*a* has been described with reference to FIG. 6, but the same applies to the communication apparatuses 101*b* to 101*z* included in the synchronous imaging system 100. In addition, the Delay Request packet that is a PTP packet has been described, but the above-described technique according to the present exemplary embodiment can also be applied to a Sync packet and a Follow Up packet.

As described above, in the present exemplary embodiment, it is detected that the time synchronization sequence using a time synchronization packet is being executed, and during a period during which it is detected that the time synchronization sequence is being executed, an image packet is transferred after being divided into a plurality of image packets. Thus, according to the present exemplary embodiment, even without the use of the standards of the IEEE 802.1Qbu and 802.3br, it is possible to perform both transfer of image data with large transmission capacity and transfer of control data for executing time synchronization required to be executed in real time.

The connection configuration of the sensor systems 190*a* to 190*z* is not limited to a daisy chain. For example, a star-shaped network configuration in which the sensor systems 190*a* to 190*z* are connected to the hub 140, and data transmission and reception between the sensor systems 190*a* to 190*z* are performed via the hub 140 may be employed.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154700, filed Sep. 28, 2022, which is hereby incorporated by reference herein in its entirety.

What is claimed is:

1. A communication apparatus that performs time synchronization using a received time synchronization packet, the communication apparatus comprising:

a division unit configured to, in a case where an image packet to be transferred to a different communication apparatus exists during a period during which the time synchronization packet is to be transmitted, divide the image packet into a plurality of divided image packets, wherein the image packet is an image packet received from an outside communication apparatus or an image packet generated by acquiring an image from an imaging apparatus associated with the communication apparatus;

a first generation unit configured to generate a plurality of communication headers corresponding to the plurality of divided image packets; and a second generation unit configured to generate a plurality of new image packets by combining the plurality of communication headers with the plurality of divided image packets; and a transfer unit configured to transfer the plurality of new image packets generated by the second generation unit to the different communication apparatus.

2. The communication apparatus according to claim 1, wherein the period during which the time synchronization packet is to be transmitted is a period from when the time synchronization packet is received to when a predetermined time elapses.

3. The communication apparatus according to claim 2, wherein the predetermined time is a time at which all predetermined packets for time synchronization are received from apparatuses connected to the communication apparatus.

4. The communication apparatus according to claim 3, wherein the time synchronization packet is a Sync packet used in a Precision Time Protocol, and the predetermined packets are Delay Request packets.

5. The communication apparatus according to claim 1, wherein the communication apparatus does not use standards of Institute of Electrical and Electronics Engineers (IEEE) 802.1Qbu and 802.3br.

6. The communication apparatus according to claim 3, wherein connection connecting apparatuses connected to the communication apparatus and the communication apparatus is daisy chain connection.

7. The communication apparatus according to claim 1, wherein the image packet before being divided has a size larger than or equal to 1.5 kilobytes.

8. The communication apparatus according to claim 1, wherein, in a case where a payload length of the image packet does not exceed a predetermined length, the division unit does not divide the image packet into the plurality of divided image packets.

9. The communication apparatus according to claim 8, further comprising a rewriting unit configured to rewrite a communication header of the image packet, wherein, in a case where the division unit does not divide the image packet into the plurality of divided image packets, the transfer unit transfers the image packet using the rewritten communication header.

10. A control method of a communication apparatus that performs time synchronization using a received time synchronization packet, the control method comprising:

in a case where an image packet to be transferred to a different communication apparatus exists during a period during which the time synchronization packet is to be transmitted, dividing the image packet into a plurality of divided image packets, wherein the image packet is an image packet received from an outside communication apparatus or an image packet generated by acquiring an image from an imaging apparatus associated with the communication apparatus; and generating a plurality of communication headers corresponding to the plurality of divided image packets;

generating a plurality of new image packets by combining the plurality of communication headers with the plurality of divided image packets; and transferring the plurality of new image packets to the different communication apparatus.

11. A non-transitory storage medium storing a program causing a communication apparatus that performs time synchronization using a received time synchronization packet to execute a control method, the control method comprising:

in a case where an image packet to be transferred to a different communication apparatus exists during a period during which the time synchronization packet is to be transmitted, dividing the image packet into a plurality of divided image packets, wherein the image packet is an image packet received from an outside communication apparatus or an image packet generated by acquiring an image from an imaging apparatus associated with the communication apparatus;

generating a plurality of communication headers corresponding to the plurality of divided image packets;

generating a plurality of new image packets by combining the plurality of communication headers with the plurality of divided image packets; and transferring the plurality of new image packets to the different communication apparatus.

* * * * *